United States Patent
Baudat

(10) Patent No.: US 10,264,164 B2
(45) Date of Patent: Apr. 16, 2019

(54) SYSTEM AND METHOD OF CORRECTING IMAGING ERRORS FOR A TELESCOPE BY REFERENCING A FIELD OF VIEW OF THE TELESCOPE

(71) Applicant: Gaston Daniel Baudat, Glenmoore, PA (US)

(72) Inventor: Gaston Daniel Baudat, Glenmoore, PA (US)

(*) Notice: Subject to any disclaimer, the term of this patent is extended or adjusted under 35 U.S.C. 154(b) by 0 days.

(21) Appl. No.: 15/883,089

(22) Filed: Jan. 29, 2018

(65) Prior Publication Data

US 2018/0220047 A1 Aug. 2, 2018

Related U.S. Application Data

(60) Provisional application No. 62/451,126, filed on Jan. 27, 2017.

(51) Int. Cl.
| | |
|---|---|
| *H04N 5/217* | (2011.01) |
| *H04N 5/225* | (2006.01) |
| *H04N 5/232* | (2006.01) |
| *G06T 7/32* | (2017.01) |
| *G02B 23/00* | (2006.01) |

(52) U.S. Cl.
CPC ............ *H04N 5/217* (2013.01); *G06T 7/32* (2017.01); *H04N 5/2258* (2013.01); *H04N 5/23203* (2013.01); *H04N 5/23212* (2013.01); *H04N 5/23222* (2013.01); *H04N 5/23299* (2018.08); *G02B 23/00* (2013.01); *G06T 2207/20032* (2013.01)

(58) Field of Classification Search
CPC ........................... H04N 5/23299; G02B 23/00
See application file for complete search history.

(56) References Cited

U.S. PATENT DOCUMENTS

| | | | |
|---|---|---|---|
| 9,319,638 B1 | 4/2016 | Baudat | |
| 9,473,690 B1* | 10/2016 | Baudat | ............... H04N 5/23212 |
| 9,749,522 B2* | 8/2017 | Holmes | ..................... G06T 7/80 |
| 2014/0267640 A1* | 9/2014 | Barziza | ................ H04N 5/2252 348/61 |

* cited by examiner

*Primary Examiner* — Gary C Vieaux

(57) ABSTRACT

A method of correcting imaging errors for a telescope by referencing a field of view of the telescope is used to replace the need of a guide star and the related use of centroid techniques with the guide star. In order to accomplish this, this method uses the full frame of a supplemental camera for both auto-guiding and auto-focusing. All of the guider frame is used to retrieve focus and directionality information for auto-focus, but without the need of a specific guide star. This method uses any astronomical feature and structure, such as galaxies, nebulae, clusters, stars, etc., for retrieving image focus information (from the latest guider frame) to compute auto-focus and related focuser corrections, including the direction of the correction (in or out).

15 Claims, 13 Drawing Sheets
(4 of 13 Drawing Sheet(s) Filed in Color)

SYSTEM AND METHOD OF CORRECTING IMAGING ERRORS FOR A TELESCOPE BY REFERENCING A FIELD OF VIEW OF THE TELESCOPE

The current application claims a priority to the U.S. Provisional Patent application Ser. No. 62/451,126 filed on Jan. 27, 2017. The current application is filed on Jan. 29, 2018 while Jan. 27, 2018 was on a weekend.

FIELD OF THE INVENTION

The present invention generally relates to the need to replace the use of a guide star (or guide stars) and to replace the related use of guide star centroid techniques, by using the all guiding camera (guider) frame for both, auto-guiding and auto-focusing. More specifically, the present invention uses the entire field of view for a telescope as a reference for auto-guiding and auto-focusing.

BACKGROUND OF THE INVENTION

Introduction

This disclosure refers to the following utility patents: U.S. Pat. No. 9,319,638 B1 (on-axis guider [ONAG]) and U.S. Pat. No. 9,473,690 B1 (real time auto-focus, known as the SharpLock [SL] technology).

By processing all of the guider frame, there is no need for the user (or any software) to search and select a suitable guide star (or few), instead any astronomical feature and structure present in the guider's field of view (FOV), such as galaxies, nebulae, clusters, stars, etc., are used for retrieving image registration information and focus information (including directionality for the focuser) and to compute auto-guiding and auto focus corrections in real time.

Since all of the guider frame is used and processed, this technique leads to a better signal-to-noise ratio (SNR) in order to achieve higher astronomical object magnitude limits and greatly decrease any seeing induced errors dues to small isoplanatic angles when dealing with just a single guide star.

The seeing effect is averaged out across the guider's FOV which is usually much larger than the isoplanatic patch, especially when using the same scope for imaging and guiding (off-axis guider [OAG], ONAG, self-guided cameras, etc.). Basically, the present invention replaces a local processing (using one guide star, or few) with a global processing involving the all guider frame. In addition, no assumption need to be made about the guide image structure, unlike for today's centroid based techniques.

Astro-imaging requires single exposures (a frame) stretching from few minutes to hours depending of the target luminosity. Long exposures are quite common for deep space faint objects, such as nebulae and galaxies. Today's digital technology allows for taking multiple frames of a target with exposure times ranging from a few minutes to half an hour. These frames are then digitally aligned, stacked, and processed to make the final image. The resulting total exposure time could amount to several hours or more. Sometimes, the total exposure time takes several nights which can stretch over a period of weeks to collect enough frames to create the final image.

During an exposure for the current frame, the imaging camera (imager) shutter is opened, and, therefore, the telescope must remain on target and focused the all-time. Tracking errors in a fraction of an arc-seconds are enough to blur images, especially when working with long (typically above one meter) scope focal lengths. Therefore, active guiding, correcting the mount tracking error, atmospheric refraction, setup flexure, temperature dilatation/shrinkage, etc. becomes necessary to reach this level of accuracy.

Today, this is done using a guide star with a secondary camera, or guider. The guide star position is monitor by the guider and any deviation from the initial position are detected and used to send a correction feedback to the mount, or any devices (such as adaptive optics) in charge of keeping the scope optical axis aligned to the target. This is known as auto-guiding.

Also, during the course of taking a frame, it is paramount that the camera sensor plane remains at the telescope focal plane (best focus). Any change, even tiny, in the focus may lead to significant degradation of the frame quality, due to blur (circle of confusion) and other optical distortions associated with out-of-focus situations (coma, astigmatism, field curvature, chromatic aberrations, etc.). For instance, under good viewing conditions, a star profile, typically described by its Full Width at Half Maximum (FWHM) could be as low as 1 arc-second ("). Diffraction limited telescopes easily resolves this problem. However, the imager camera must be precisely set at best focus to achieve this resolution.

As an example, assume a 2 meters (m) focal length scope at F/6. In addition, 1" translates to: $\tan(1/3600 \cdot pi/180) \cdot 2 = 9.7$ um (microns). Moving the focus plane (for an F/6 scope) by $6 \cdot 9.7$ um=58.2 um will double the star profile due to the out-of-focus blur. In order to keep this effect to a minimum, the defocus values should be limited to around $+/-6$ um, which roughly corresponds to $1/10$th of the star profile. This is usually the value above which a human inspection would detect the change in star size.

Auto-Guiding:

Today's auto-guiding algorithms and related software use at least one guide star, sometime several guide stars are used in the same time, if available in the guider's FOV. Typically, an auto-guiding algorithm computes the guide star centroid using a simple gravity center calculation or a more advanced parametric estimation assuming some mathematical models for the starlight profile (such as a Gaussian) and fitting the function through the light profile recorded by the guider. The guide star centroid is used to retrieve image registration shift (assuming imager and guider are rigidly attached to the scope) and to send tracking correction to the mount and related devices.

In the context of multi-star guiding, each star centroid is combined with the others for proving an overall all centroid estimation and registration error for the current frame, resulting of the compilation of those star centroid (such as a simple mean, or a weighted average). Usually guiders have small chips (small diagonals) leading to a small FOV, when attached to the main scope (like with an OAG, ONAG, or a self-guided camera) finding even one guide star may be challenging and may require some mechanism to move the guider across the telescope's FOV (rotating, or X/Y stage for instance).

In some applications, a second telescope with a short focal length, known as a guide scope, is used in conjunction with the guider for auto-guiding. This usually provides a large guider FOV; however, when the main telescope's focal length is long enough (above about one meter), differential flexures (between both telescopes' optical axes) cerates challenging issues, which generally prohibits good enough tracking accuracy.

Thus, guiding with the same scope than imaging is the gold standard. Finding a guide star with a small guider may be challenging depending of the target. For instance, rotation of the guider/imager when using an OAG helps yet this requires time, moving parts, more complex mechanics. Rotator are heavy and expensive piece of equipment.

Since under most seeing limited conditions, the isoplanatic patch is just few arc-second across using one guide star significantly increases the risks to propagate seeing errors (noise) in the tracking corrections. The star wanders (and shape alterations) from the seeing and is typically only valid inside the isoplanatic patch. However, the imager's FOV is typically minutes up to one degree across. This means that the guide star seeing (inside its isoplanatic patch, or angle) is not related at all with the overall frame seeing (imager), this adds unwanted seeing noise in the auto-guiding process, especially with short guider exposure time (in the second range).

In the context of the present invention, the need of a guide star(s), and the use of centroid techniques, is replaced by processing all of the guider frame instead. The present invention uses all the information available from the all guide frame, which includes any astronomical feature and structure, such as galaxies, nebulae, clusters, stars, etc., for retrieving image registration information (from the reference one) to compute auto-guiding (and/or auto focus, see next section) and related tracking corrections for the mount and related devices.

Auto-Focusing:

Today's state of the art re-focusing methods use a reference star at regular intervals (half an hour for instance). Most of the time, this requires that the user move the telescope to a bright enough reference star, unless one is available in the imager frame's FOV and outside the current target FOV, or at least off-axis. The user must then move the focuser "in" and "out" in relation to the best focus plane while taking pictures of the reference star. Hereinafter, the term "in" refers to the telescope focal plane being moved forward with respect to the imager sensor plane, and the term "out" refers to moving the telescope focal plane backward with respect to the imager sensor plane. This can be achieved by moving the imager camera with a focuser, or moving the telescope focal plane itself, or both. Finally, the user must compare the star FWHM (or other related figures of merit) to evaluate the focus quality. This is done iteratively ("in" and "out") until the best focus is achieved (smallest FWHM for instance). This is because there is usually no information that indicates which direction the focuser should be moved to reach best focus (the out-of-focuser blur shape is usually quite identical before or after best focus, therefore there is no information of direction available). Since the star images do not indicate which direction the correction should take place ("in" or "out" versus best focus position), iterative "in" and "out" focus steps must be used to solve this problem. During the time it takes to move the scope to the reference star and refocus, it is not possible to image the target anymore. The target reacquisition could also take a significant amount of time and be a source of error. The method disclosed in the utility U.S. Pat. No. 9,473,690B1 solves those problems by refocusing during the main target imaging session by using at least one reference star in, or near target FOV, which is usually already used for auto-guiding purpose.

The system described in the utility U.S. Pat. No. 9,473,690B1 is a closed-loop system for auto-focusing in photography and a method of implementing that closed-loop system to focus the image being produced by the closed-loop system in real time. The components of the closed-loop system include an image collecting device, a focuser, an imager camera, a second camera, an optical aberration device, and a computing unit. The image collection device is an instrument used to capture the electromagnetic (EM) radiation being emitted from a remote object. In the preferred embodiment of present invention, the image collection device is a telescope. The beam selector allows the EM radiation being captured by the image collection device to be split between the imager camera and the second camera. The imager camera is used to create the image of a target being captured by the image collection device. The second camera is also used to create the image of a reference object being captured by the image collection device so that auto-focusing corrections can be generated and executed by the method disclosed in the utility U.S. Pat. No. 9,473,690B1. The second camera monitors the reference object at regular intervals, which is typically a few seconds, in order to continuously make the auto-focusing corrections in real time. In the preferred embodiment of the closed-loop system, the second camera is a guider camera, and the reference object can either be a natural star or an artificial star created by emitting a laser in the Earth's upper atmosphere. The computing unit generates the auto-focusing corrections by analyzing the image of the reference object. The focuser receives and executes the auto-focusing corrections, which improve the focus quality of the image that is being currently captured by the imager camera and the focus quality of the image that is going to be captured by the second camera. Thus, the focuser is shared by the imager camera and the second camera.

In the present invention, all of the guider frame is used to retrieve focus and directionality information for auto-focus, but without the need of a specific guide star, the new processing uses any astronomical feature and structure, such as galaxies, nebulae, clusters, stars, etc., for retrieving image focus information (from the latest guider frame) to compute auto-focus and related focuser corrections, including the direction of the correction (in or out).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

All illustrations of the drawings are for the purpose of describing selected versions of the present invention and are not intended to limit the scope of the present invention.

Figure 1:
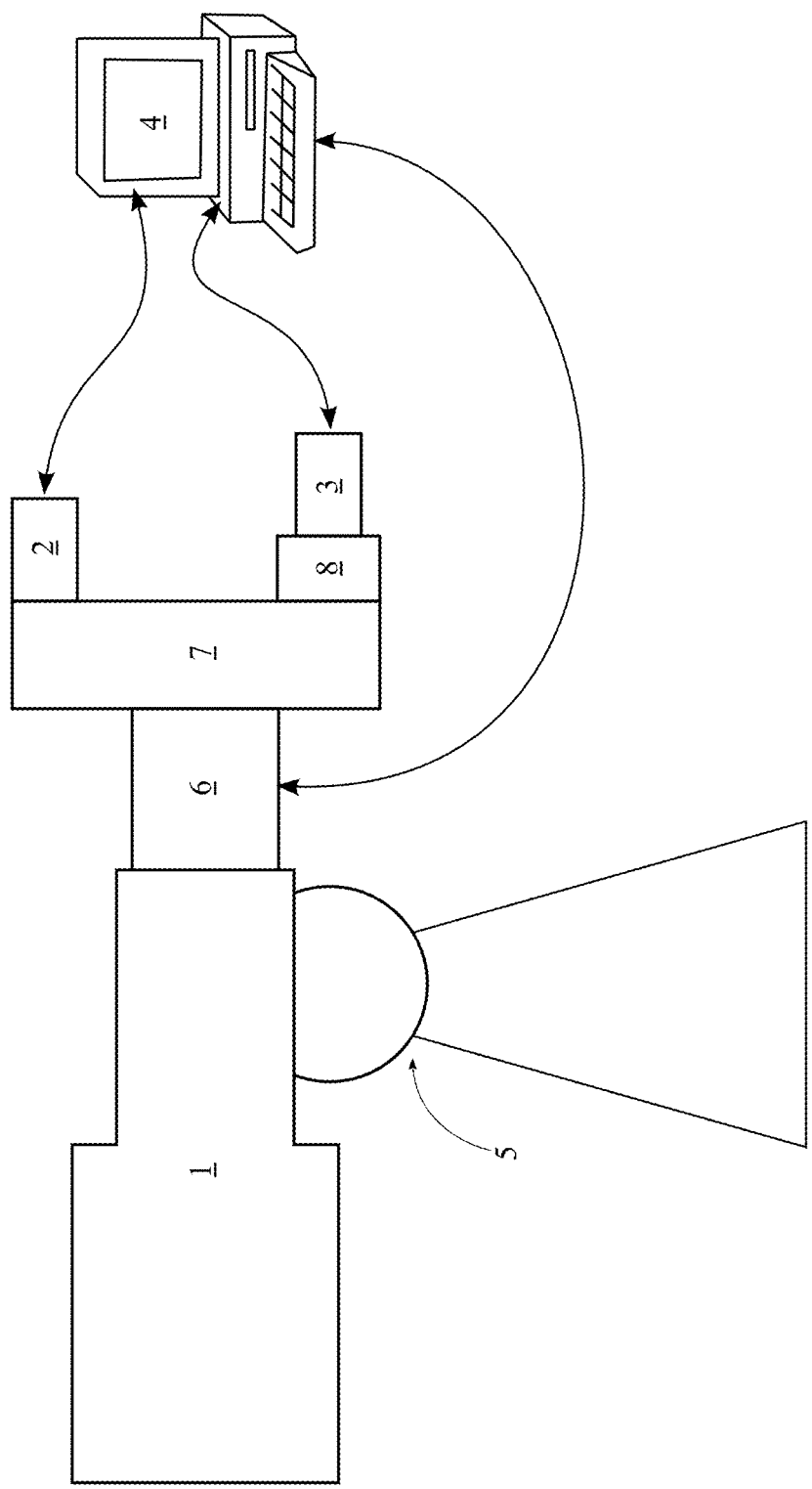
FIG. 1 is a schematic view of the system for the present invention.

The present invention is a system and a method of correcting imaging errors for a telescope by referencing a field of view (FOV) of the telescope. The present invention is used to replace the need of a guide star and the related use of centroid techniques with the guide star. In order to accomplish this, the present invention uses the full frame of a supplemental camera for both auto-guiding and auto-focusing. As can be seen in FIG. 1, the preferred embodiment of the system used to implement the method of the present invention is provided with an image collecting device 1, a science camera 2, a second camera 3, a computing device 4, and an orientation mechanism 5 (Step A). The image collecting device 1 is an instrument used to capture the electromagnetic (EM) radiation being emitted from a remote object. The image collecting device 1 is preferably a telescope. The science camera 2 is used to create the image of a target being captured by the image collecting device 1. The science camera 2 is preferably an imager camera. The second camera 3 is also used to create the image of a reference being captured by the image collecting device 1 so that the auto-guiding corrections and auto-focusing corrections can be generated and executed by the present invention. The second camera 3 monitors the reference at regular intervals, which is typically a few seconds, in order to continuously make the auto-guiding and auto-focusing corrections in real time. The second camera 3 is preferably a guider camera, and the reference is any other remote objects within the entire FOV of the image collecting device 1. The computing device 4 is used for any processing or computations that are needed for the method of the present invention. The orientation mechanism 5 is used to adjust the translation and the rotation of the image collecting device 1 so that the image collecting device 1 remains oriented towards the target.

Figure 2:
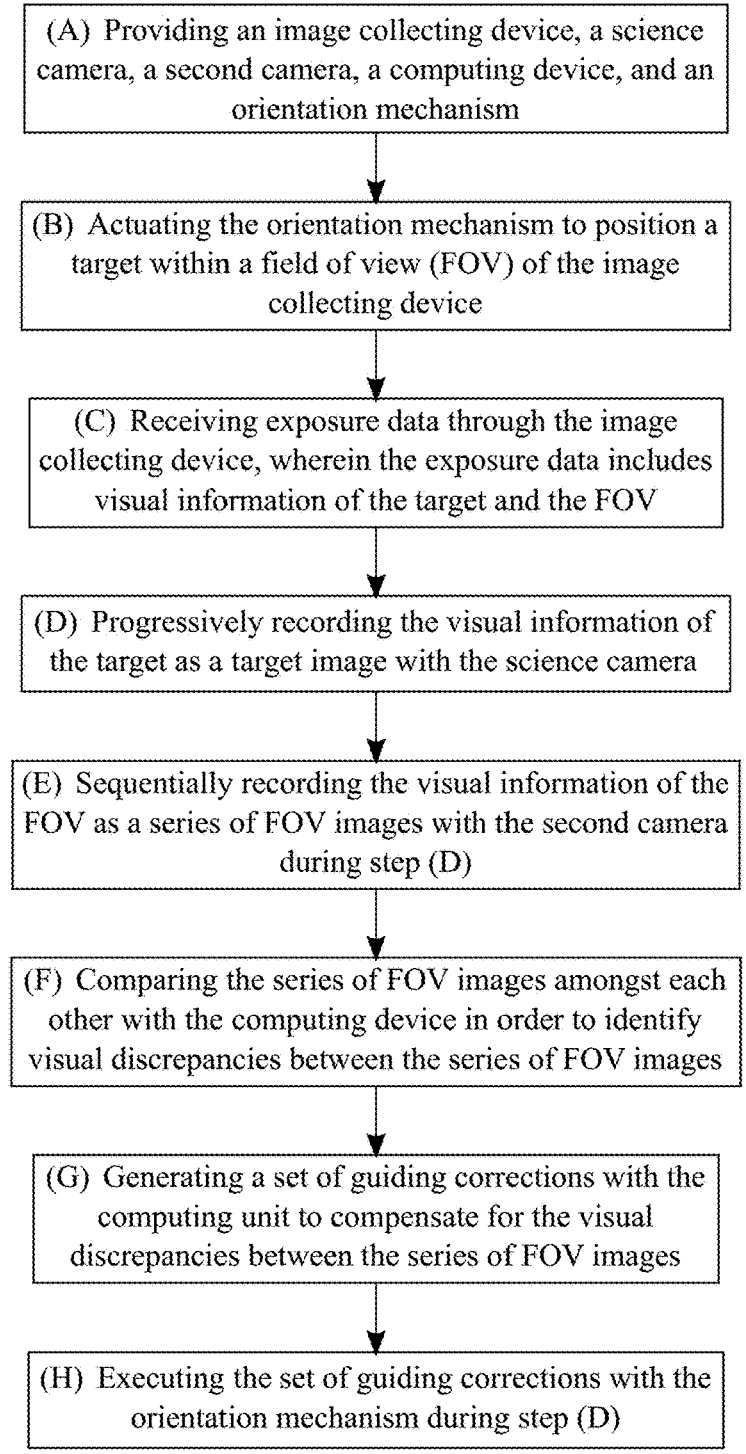
FIG. 2 is a flowchart illustrating the overall process of the method for the present invention.

As can be seen in FIG. 2, the overall process followed by the method of the present invention allows the aforementioned components of the system to correct imaging errors for a telescope by referencing a FOV of the telescope. The overall process begins by actuating the orientation mechanism 5 to position a target within the FOV of the image collecting device 1 (Step B). The target is typically any astronomical object, such as a star, a galaxy, a cluster, or a nebula. The overall process continues by receiving exposure data through the image collecting device 1 (Step C). The exposure data is the visual information or the EM radiation for the target and the FOV. The exposure data is then sent to the science camera 2 so that the science camera 2 is able to progressively record the visual information of the target as a target image with the science camera 2 (Step D). The target image typically captures a desired astronomical object. Concurrent with Step D, the exposure data is also sent to the second camera 3 so that the second camera 3 is able to sequentially record the visual information of the FOV as a series of FOV images (Step E). The series of FOV images typically captures other objects surrounding the desired astronomical object, which can used as astronomical references for the present invention. In addition, a beam selector 7 is preferably used to optically split the exposure data between the science camera 3 and the second camera 4.

The overall process continues by comparing the series of FOV images amongst each other with the computing device 4 in order to identify visual discrepancies between the series of FOV images (Step F). The visual discrepancies are changes from one image to the next image in the series of FOV images, which should not occur because the science camera 2 is capturing the target image over an extended exposure time. If the visual discrepancies between the series of FOV images occur during the extended exposure time, then the computing device 4 generates a set of guiding corrections that is able to compensate for those visual discrepancies. The set of guiding corrections can include, but is not limited to, translation adjustments to the image collecting device 1 and rotation adjustments to the image collecting device 1. The set of guiding corrections is consequently executed with the orientation mechanism 5 over the course of Step D so that the image collecting device 1 remains properly oriented towards the target during the entire extended exposure time.

Figure 3:
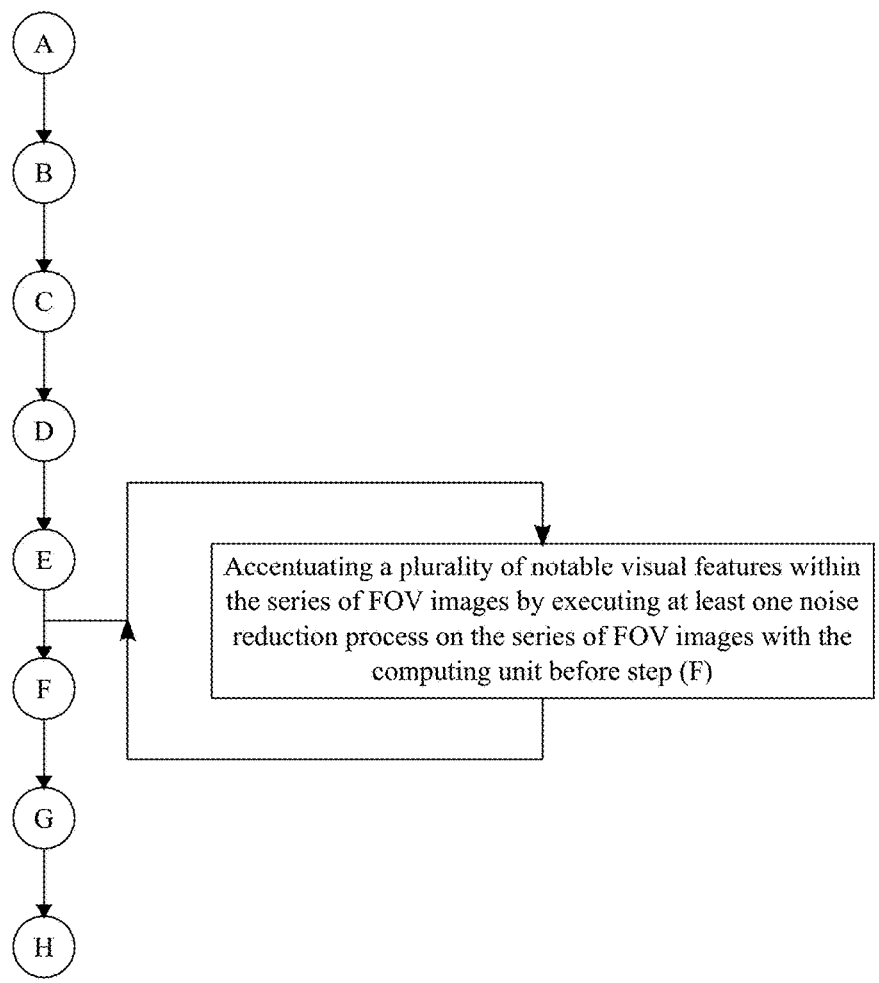
FIG. 3 is a flowchart illustrating when to execute at least one noise reduction process.

In order to improve the efficiency and the effectiveness of the overall process, the computing device 4 accentuates a plurality of notable visual features within the series of FOV images by executing at least one noise reduction process on the series of FOV images with the computing unit before Step F, which is shown in FIG. 3. The plurality of notable visual features is any objects surrounding the astronomical target, which include, but are not limited to, galaxies, nebulas, clusters, and stars. The at least one noise reduction process allows to the plurality of notable visual features to be more prominent across the dark backdrop of space.

One kind of noise reduction process is used to improve the readability over the entire series of FOV images. For this noise reduction process, the computing device 4 needs to designate a reference image and a plurality of subsequent images from the series of FOV images. Each subsequent image is compared against the reference image, which is typically captured at the beginning of the extended exposure time for the science camera 2. Thus, the reference image needs to be captured with more detail than the plurality of subsequent images, which is accomplished by recording the reference image over a longer exposure time than the plurality of subsequent images during Step E. A longer exposure time is not provided to the plurality of subsequent images because a longer exposure time for each of the plurality of subsequent images is a processing burden on the computing device 4.

Another kind of noise reduction process is to apply a spatial median filter to each image within the series of FOV images with the computing device 4. The spatial median filter is typically used to remove the hot/dead pixels from an image as well as remove artefacts (i.e. gamma ray impacts) from the image. The spatial median filter is also applied to an image as a pre-processing step before other kinds of noise reduction filters are applied to the image.

Another kind of noise reduction process is to remove a constant amount of noise across an entire image. The computing device 4 begins by mapping an intensity pattern for each image within the series of FOV images. The intensity pattern includes an intensity value for each pixel across the entire image, and, consequently, the computing device 4 is able to statistically extract a median intensity value from the intensity pattern. The computing device 4 is then able to compare the median intensity value to the intensity pattern in order to assess a noise pedestal for the intensity pattern, which is the base amount of noise identified throughout the intensity pattern. The computing device 4 then compares the median intensity value to the noise pedestal across the intensity pattern in order to estimate a noise-floor standard deviation, which describes statistical deviation of the noise pedestal across the intensity pattern. The computing device 4 finally removes the noise pedestal and a portion of the noise-floor standard deviation from the intensity pattern in order to maximize the signal-to-noise ratio (SNR) for each image within the series of FOV images.

Figure 5:
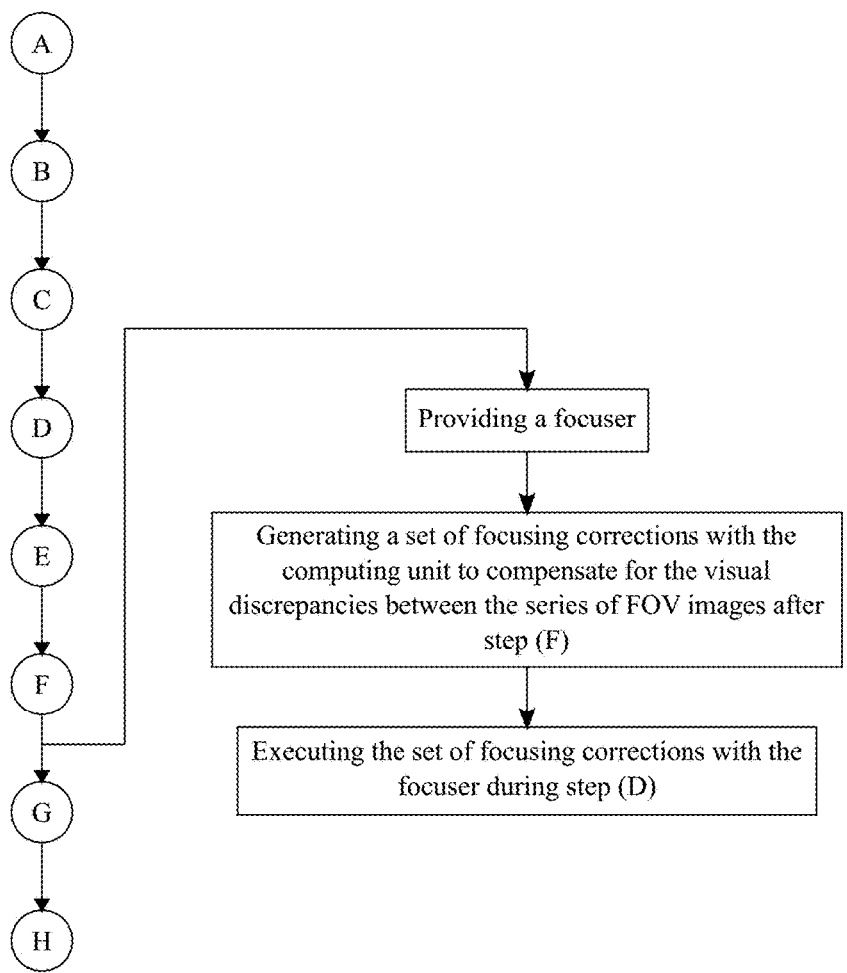
FIG. 5 is a flowchart illustrating a sub-process for implementing a focuser for the present invention.

The system of the present invention is further provided with a focuser 6, which is receives and executes the auto-focusing corrections. As can be seen in FIG. 5, the focuser 6 improves the focus quality of the target image that is being captured by the science camera 2 and improves the focus quality of the series of FOV images that is being captured by the second camera 3. Thus, the focuser 6 is functionally shared by the science camera 2 and the second camera 3. In addition, the same visual discrepancies between the series of FOV images can be used to generate a set of focusing corrections with the computing unit after Step F. The set of focusing corrections is consequently executed with the focuser 6 over the course of Step D so that the image collecting device 1 remains properly focused on the target during the entire extended exposure time.

Figure 4:
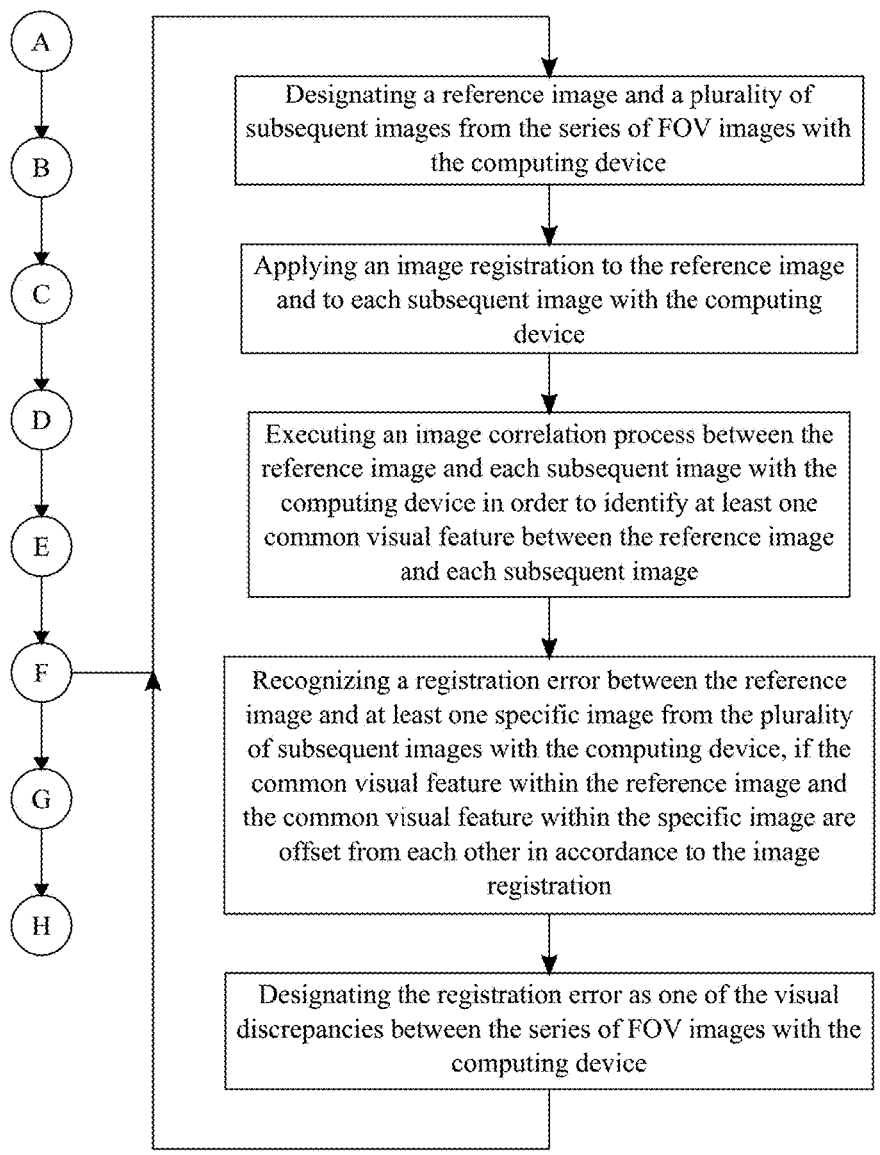
FIG. 4 is a flowchart illustrating a sub-process for determining a registration error that is corrected by the orientation mechanism.
Figure 6:
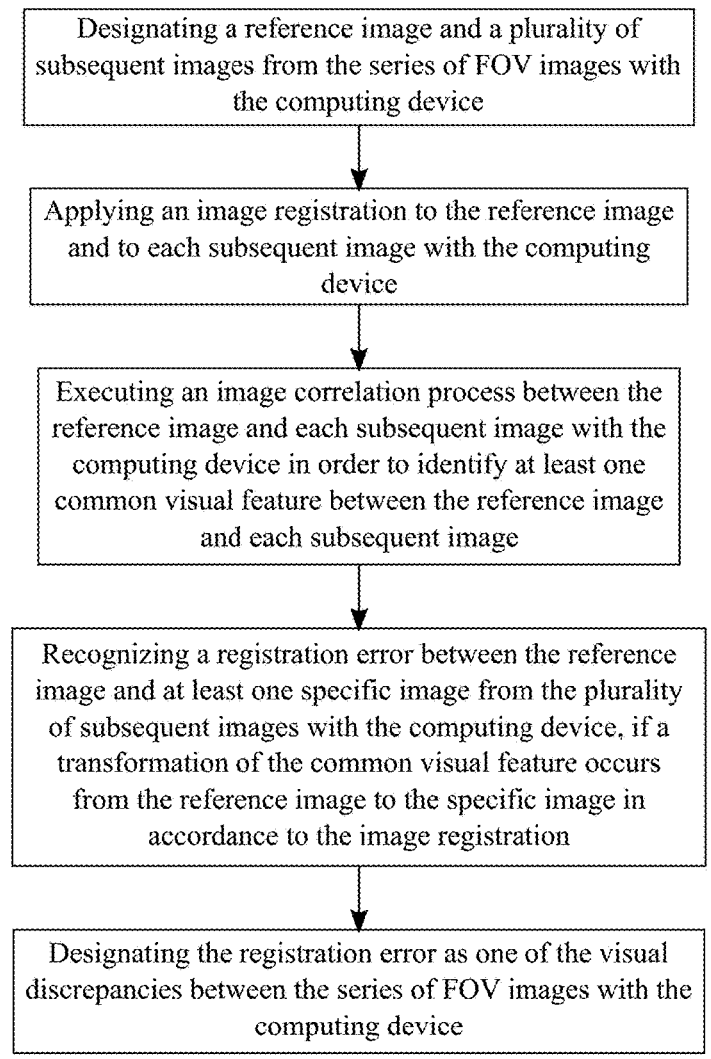
FIG. 6 is a flowchart illustrating a sub-process for determining a registration error that is corrected by the focuser.

For both auto-guiding and auto-focusing, the computing device 4 is also used to execute a sub-process for the comparison amongst the series of FOV images in Step F, which is shown in FIGS. 4 and 6. For this sub-process, the computing device 4 needs to designate a reference image and a plurality of subsequent images from the series of FOV images. As mentioned above, each subsequent image is compared against the reference image, which is typically captured at the beginning of the extended exposure time for the science camera 2. The sub-process begins by applying an image registration to the reference image and to each subsequent image with the computing device 4. The image registration applies a universal coordinate system to all of the associated images so that a transformation from one image to the next image can be recognized by the computing device 4. The sub-process continues by executing an image correlation process between the reference image and each subsequent image with the computing device 4 in order to identify at least one common visual feature between the reference image and each subsequent image. Some common visual features that can be distinguished between the reference image and each subsequent image include, but are not limited to, galaxies, nebulas, clusters, and stars. The common visual feature can also be a single guide star. However, the present invention is designed to use a plurality of common visual features across the entire FOV, which improves the ability of the present invention to accurately identify the visual discrepancies between the series of FOV images. Moreover, the present invention can execute many different embodiments of the image correlation process in order identify the at least one common visual feature between the reference image and each subsequent image. One specific embodiment of the image correlation process compares an intensity pattern of the reference image to an intensity pattern of each subsequent image via correlation metrics, which allows the computing device 4 to identify similar intensity sections between the reference image and each subsequent image.

For auto-guiding, the sub-process continues by recognizing a registration error between the reference image and at least one specific image from the plurality of subsequent images with the computing device 4. As can be seen in FIG. 4, the computing device 4 recognizes the registration error if the common visual feature within the reference image and the common visual feature within the specific image are offset from each other in accordance to the image registration. For example, if the common visual feature in the reference image is located at the origin in the image registration, and if the common visual feature in the specific image is located at 2 units in the x-direction and 3 units in the y-direction, then the computing device 4 recognizes a registration error between the reference image and the specific image. The sub-process concludes by designating the registration error as one of the visual discrepancies between the series of FOV images with the computing device 4. Moreover, the registration error can lead to two different kinds of guiding corrections. First, if the computing device 4 recognizes a translational offset between the common visual feature within the reference image and the common visual feature within the specific image in accordance to the image registration, then the computing device 4 will generate a translation guiding correction to be made by the orientation mechanism 5 in Step G. Second, if the computing device 4 recognizes a rotational offset between the common visual feature within the reference image and the common visual feature within the specific image in accordance to the image registration, then the computing device 4 will generate a rotational guiding correction to be made by the orientation mechanism 5 in Step G.

For auto-focusing, the sub-process may continue by recognizing an additional registration error between the reference image and the specific image with the computing device 4. As can be seen in FIG. 6, the computing device 4 recognizes the registration error if a transformation of the common visual feature occurs from the reference image to the specific image in accordance to the image registration. As disclosed in U.S. Pat. No. 9,473,690, the transformation is preferably created by an optical aberration device 8 that is integrated into the optical path from the beam selector 7 to the second camera 3. For example, if the common visual feature has a circular shape in the reference image in accordance to the image registration, and if the common visual feature changes to an oblong shape in the specific image in accordance to the image registration, then the computing device 4 recognizes a registration error between the reference image and the specific image. Moreover, the registration error can lead to two different kinds of focusing corrections. First, if the computing device 4 recognizes the transformation of the common visual feature is elongated in a first direction, then the computing device 4 will generate an intra-focal correction to be made by the focuser 6. Second, if the computing device 4 recognizes the transformation of the common visual feature is elongated in a second direction, then the computing device 4 will generate an extra-focal correction to be made by the focuser 6. The computing device 4 is able to determine whether an intra-focal correction or an extra-focal correction is necessary for the image collecting device 1 to remain properly focused on the target because the first direction and the second direction are perpendicular to each other.

Figure 7:
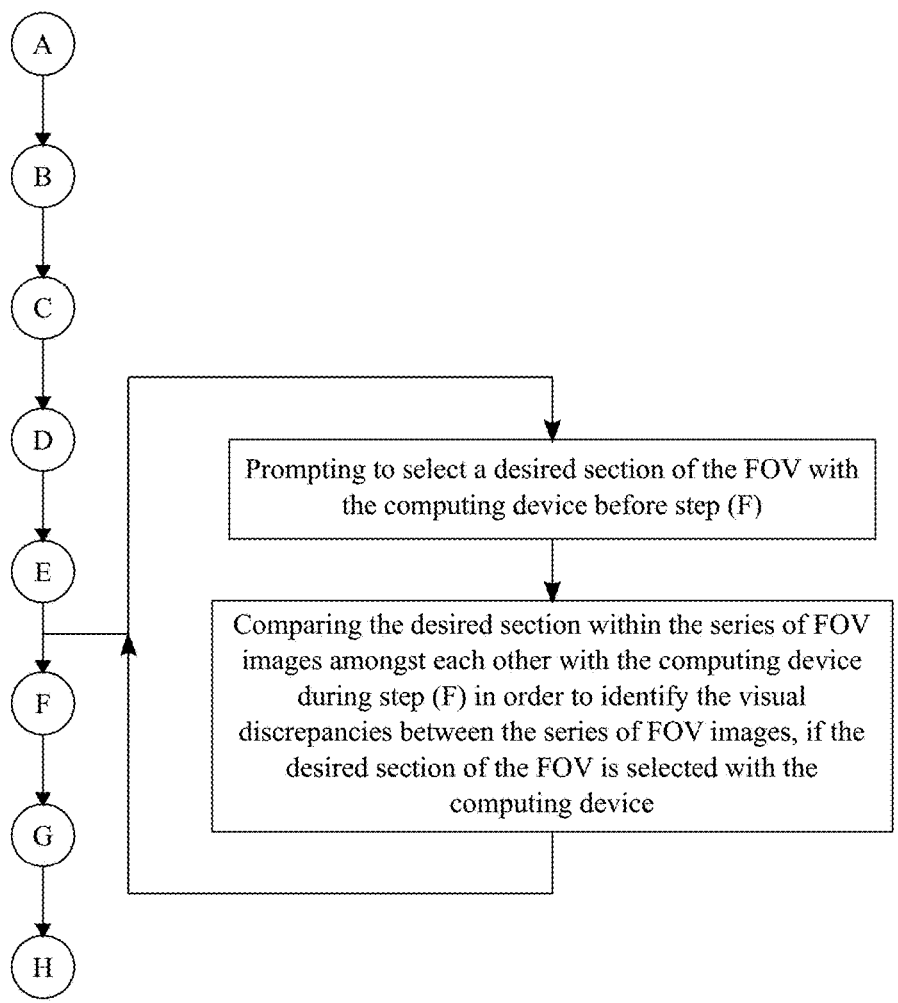
FIG. 7 is a flowchart illustrating a sub-process for specifying a desired section to be used in the comparison of the series of FOV images.

The method of the present invention allows for a user to select a specific section from each image in the series of FOV images for the comparison in Step F. For example, the user can select the top left section of each FOV image because the top left section is known to have very stable and distinguishable astronomical features, such as bright stars, which work well as references for auto-guiding and auto-focusing. Thus, the computing device 4 prompts the user to select a desired section of the FOV before Step F, which is shown in FIG. 7. If the desired section of the FOV is selected by the user with the computing device 4, then the computing device 4 only compares the desired section within the series of FOV images amongst each other during Step F in order to identify the visual discrepancies between the series of FOV images. Moreover, the computing device 4 will not generate guiding or focusing corrections for any visual discrepancies identified outside the desired section.

Figure 8:
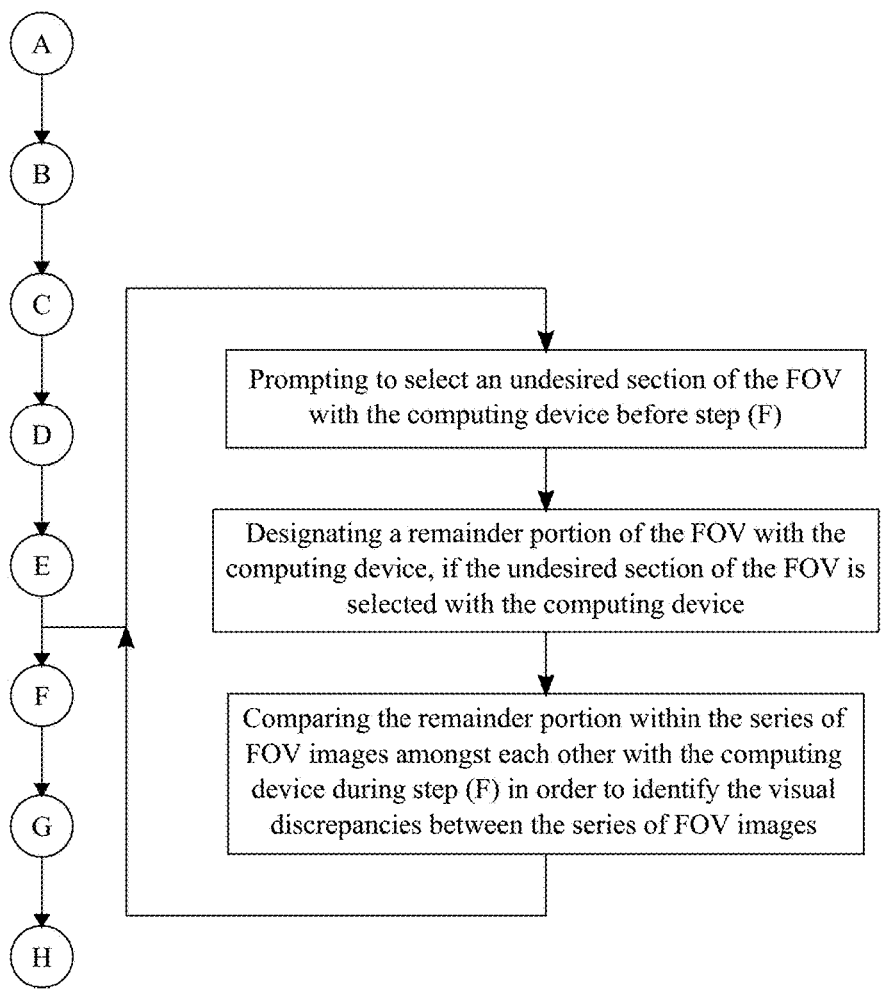
FIG. 8 is a flowchart illustrating a sub-process for specifying an undesired section to not be used in the comparison of the series of FOV images.

The method of the present invention also allows for a user to exclude a specific section from each image in the series of FOV images for the comparison in Step F. For example, the user can select the top left section of each FOV image because the top left section is known to have very fast-moving astronomical object, such as a comet or an asteroid, which do not work well as references for auto-guiding and auto-focusing. Thus, the computing device 4 prompts the user to select an undesired section of the FOV before Step F, which is shown in FIG. 8. If the desired section of the FOV is selected by the user with the computing device 4, then the computing device 4 designates a remainder portion of the FOV and only compares the remainder portion within the series of FOV images amongst each other during Step F in order to identify the visual discrepancies between the series of FOV images. Moreover, the computing device 4 will not generate guiding or focusing corrections for any visual discrepancies identified within the undesired section.

Supplemental Description of Full Guide Frame Processing:

In the present invention, all of the guider frame (sensor area) is used. A first reference guide image (for auto-guiding purpose) is taken, its exposure time can be different (usually longer) than the next frames used for computing auto-guiding and auto-focus. A longer exposure may be used for boosting SNR on the reference frame, if/when needed. A long exposure may lead to some image shift due to tracking errors, however those shifts are usually negligible in regard of the astronomical structure/feature information available in the guide frame for this processing. Then consecutive guide frames are taken (at different times, say every few seconds, but any time interval, uniform or not is a valid option). Those have an exposure time which can be different than the reference one (often shorter) or even from each other. Each frame is pre-processed to maximize its SNR. The goal is to keep any astronomical structures/features, such as such as galaxies, nebulae, clusters, stars, etc., while removing most of the noise (thermal, reading, and shoot noise) and fuzzy structures. It is understood that from a digital image processing state of the art many techniques can be used to achieve this goal, therefore one are not limited to the processing disclosed in this document, which is mainly for the sake of explanation. It is also understood that not all those processing are always required. First a spatial median filter (such as 3×3) is applied to the frame for removing hot/dead pixels as well as artefacts, such gamma ray impacts. Dark, bias, flat and other off-line guide reference frames can be used (very common and standard processing in astro-imaging) if needed for improving the noise reduction/estimation and the overall processing including fixed pattern noise from the camera and optical artefacts, dust, etc.

Other spatial filters may be used to enhance the useful astronomical structure relevant for auto-guiding and auto-focus, such as high/low past filters, or band pass filters, as well as match filters. It is understood that spatial filtering of the guide frame can be accomplished by spatial convolution or by a simple product when using the Fourier transform (usually an FFT), the later may be more efficient in term of computing power and time. Noise in the image is the result of several effects, including thermal noise, read noise and shot noise (Poisson noise).

For noise reduction, a common approach is to estimate the image offset value (pedestal), if any, using the median (or by sorting the pixel level values and then keep a subset, say 10%, for offset calculation) of the all guide frame pixel intensity values. Since a lot of the pixels are dark, astronomical image tend to be sparse, this provides a good and robust approach to access the image offset value as well as the noise floor standard deviation. One can use the median (or some sorting/ranking methods, like above) of the absolute (or squared) differences between the offset value at the pixel values to estimate the noise floor standard deviation without be impacted by the useful information in the image (astronomical structures/features). Again, a lot of pixel do not carry any useful information beside noise and median, or sorting methods, provide a robust estimation of the noise floor.

To reduce the noise in the image for further processing, one can subtract the offset and some of the noise floor standard deviation (coming from the above estimations) to the frame (pixel by pixel). This can be done in a "hard" way such any pixel above the offset value plus some time (a real positive number) the noise standard deviation is set to zero (thresholding). Alternatively, a "soft" probabilistic way can be used by assuming some probability density function PDF (such as a normal PDF) for the noise. One would decrease any pixel value (multiplying it by a positive correction factor less than or equal to 1) above the offset level accordingly to its probability to be noisy (related to the estimated PDF). The further a pixel value is from the noise floor (in noise standard deviation unit) the less its value is decreased, eventually the correction factor would be set to 1 above some level. After having processed the frames (the reference and the others), there are two tasks to perform, auto-guiding and auto-focus.

Supplemental Description on Auto-Guiding:

To be able to provide tracking corrections to the mount and related devices, any registration errors between the reference frame and the subsequent guide frames most be found and estimate. Today, this is done by computing the centroid of a guide star (or several guide stars) and comparing the centroid positions (in the horizontal X, and vertical Y image coordinates) between the reference frame and the current frame. The X and Y centroid differences (between the reference guide frame and the current guide frame) are related to the shift, if any, of the scope optical axis in the sky, for any reason. Using the centroid differences, the setup optical information, pixel size and mount specifications one can easily compute corrections in right ascension (RA) and declination (DEC) (or in other reference system depending of the mount) to be sent to the mount controller, or related devices such as an AO, or both. This is the basic operation of an auto-guider system, which is well known and will not be describe in more details here.

In the present invention, the registration information between the reference frame and the other frames (or any frames) is retrieved using the full frame (after the above pre-processing). There is no selection of any specific star nor calculation of any related centroid either. Instead, image correlation techniques are applied to the frames (any pair, or more, of frame concerned, usually the reference one and the current one, latest one). There are many ways to accomplish image correlation, therefore the method describes in this document is not limiting the scope of this invention it is for the sake of explanation and it should be understood that from an image processing state of the art stand point there are other approaches possible. Since image correlation (like filtering) may be computing expensive this is usually done in the Fourier domain using a 2D FFT of the frame. Assuming F1 and F2 are the 2D FFTs of two guide frames f1 and f2 (for instance the reference frame and the current frame), usually pre-processed as described above, we have:

1) F1=FFT(f1) and F2=FFT(f2)
2) f1=IFFT(F1) and f2=IFFT(F2)

where FFT(.) and IFFT(.) are respectively the 2D FFT and inverse FFT of a frame (an array).

As well as for the cross-correlation image Corr_1_2 between the frame 1# and #2:

3) Corr_1_2=IFFT(F1×conj(F2))

where the operator conj(.) is the complex conjugate of a 2D complex array.

The Corr_1_2 image is real (if f1 and f2 are real images) and exhibits peaks. The highest peak (maximum peak) is related to the maximum of correlation, its position carries information about the frame registration errors, if any. We may want to normalized the Corr_1_2 image such the maximum peak value is +1 when both images are perfectly registered and identical, like for Corr_1_1=IFF(F1×conj(F1)) (self-cross-correlation). Let's assume that for the sake of simplicity we define the Corr_1_2 image coordinate system such that for Corr_1_1=IFF(F1×conj(F1)) its maximum peaks is located at the X=0, and Y=0 (by definition). Any registration errors between f1 and f2 will leads to some dX and dY values, the maximum peak is now offset from its reference position (0, 0) by some deltas. There are two reasons for dX< >0 and/or dY< >0. One is an actual registration error coming from an actual shift of the scope optical axis and related hardware relative to the target of interest in the sky. This is useful information for computing and sending information to the mount and/or related devices for auto-guiding. Again here we are not disclosing all the details (including the calibration) to how to compute and to correct the mount, or related devices, for auto-guiding since this is prior art and similar than with a centroid based approach. The second reason is noise, or any change on the image signal (like an aircraft light, satellite, or meteor trail, or the effect of clouds), not related to an actual optical axis shift. The latter should be minimized since it will create tracking error in term of bias and noise. The same is true with today's centroid based auto-guiding algorithms. Of course the Corr_1_2 image can be further processed using filters and other methods, like those describe for pre-processing the frames, to improve the peak detection and minimize noise and artefact effect. Statistical techniques can be used to monitor the cross-correlation image peak position (dX, dY) for inferring trends and detecting unexpected event (such clouds). In turn those techniques are used to skip and/or postponed corrections which are considered aberrant. They can also be used to predict a systematic drift of the scope optical axis relative to the target and anticipate it for mount tracking control. It is understood that predictive control methods, such as Kalman's filter, as well as classic PID associated with anticipation can be used to improve guidance in the general context of auto-guiding (with full frame approach or centroid ones).

Figure 9:
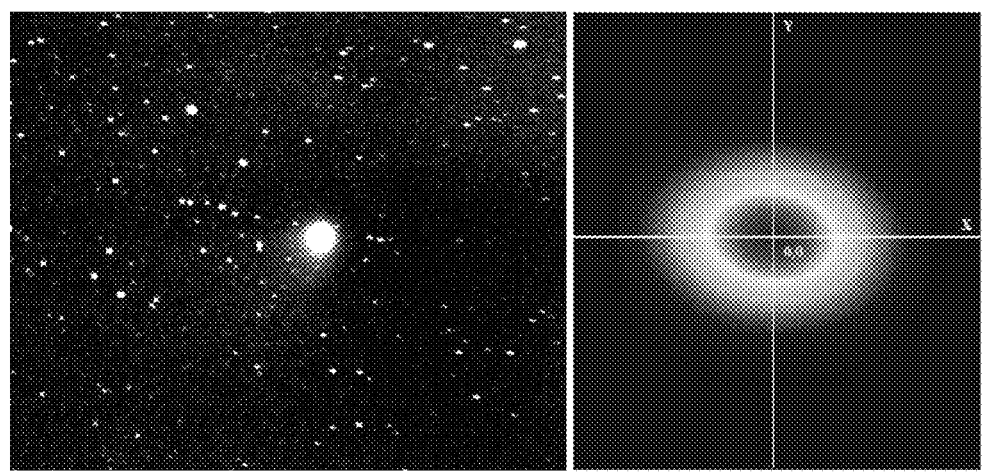
FIG. 9 is a picture showing a guide frame and a cross-correlation image with the reference frame, wherein there is no frame registration error.
Figure 10:
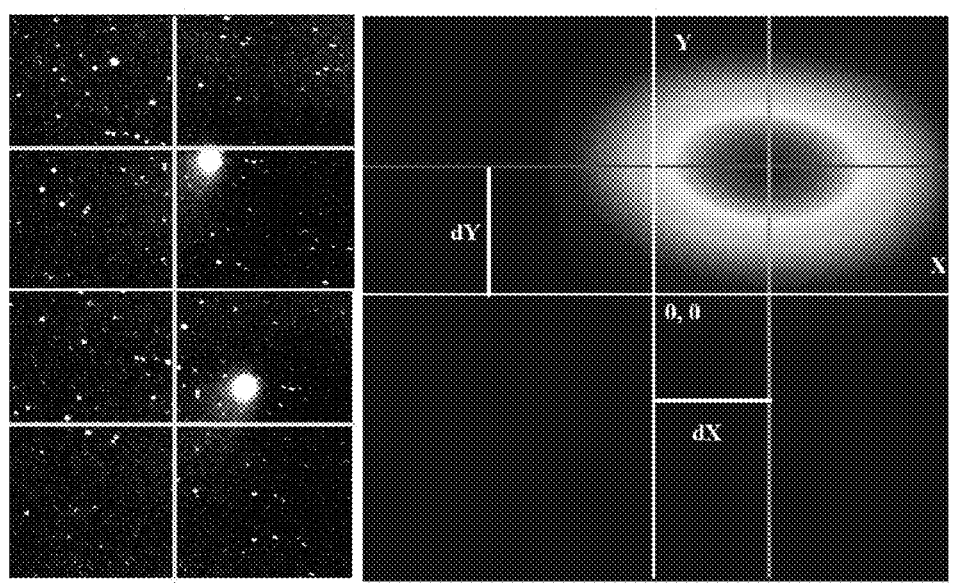
FIG. 10 is a picture showing a guide frame and a cross-correlation image, wherein there is dX, dY< >0 (not at scale).

The FIG. 9 above shows on the left the last guide frame and on the right its cross-correlation Corr_1_2 image when correlated with the guide reference frame. Corr_1_2 is zoomed and cropped to show +/−16 bits on each size of its center (X=0, Y=0). A color code is used to express the level of the Corr_1_2 function, red for the maximum, dark blue for the minimum, yellowish in between (this color code will be used in the all document). In this example, there is no registration error between the reference guide frame and the current (last) frame, the scope optical axis is on target, therefore dX=0, and dY=0. There is no tracking correction to be sent to the mount, or related devices, from an auto-guiding stand point. It should be understood that the X and Y axis of the guide image and the Corr_1_2 axis are related to the physical position of the guider, calculation of the DEC and RA corrections (or others) may require more processing using the dX and dY values and the relationship between the guider sensor plane orientation and the scope/mount axis. This is usually done during initial setup and calibration, like with any traditional auto-guiding software. The same is true about the mapping between the pixel size of the guider and the actual motion (in arc-second) in the sky. All of this is just prior art, details information is publicly available about auto-guiding calibration and image scale management. In term of auto-guiding calibration the same can be done when using the Corr_1_2 image instead of the actual guide frame. Since this is well known processing this document does not provide more details on the matter. The next FIG. 10 shows the cross-correlation function when there is some registration errors (dX, dY< >0) between to guide frames (such as the initial reference frame & the last one).

The peak of the Corr_1_2 is offset in X and Y, this shift from its 0, 0 reference position is related to the guide frame registration errors as shown on the left side of the plot figure (sign and amplitude may vary depending of the calibration). The dX and dY values on the Corr_1_2 image are used for auto-guiding. Finally, it should be understood that this auto-guiding (and auto-focus) cross-correlation approach can be used with a guide image having only one star (a guide star) as well. However, unlike for today's algorithms based on centroid, in such case the shape of the star is mostly irrelevant for the processing when using a cross-correlation method as disclosed in this invention. This makes the approach of the invention much more robust to deal with aberrated star shapes (such as coma and astigmatism) often found when the guider is placed off axis (typically with OAG and self-guided cameras).

Supplemental Description of Auto Focusing:

Although auto-focus could be done using the Corr_1_2 cross-correlation between a reference frame and a current frame (or any two different frames) one will only disclose in more detail in this document the auto-focus method using one frame, usually the current (last) one. Using the last frame is handy since it allows to refocus the telescope from one night to the next when focus has shifted due to temperature for instance. However it should be understood this does not limit in any way the scope of this invention the fundamental processing and concept is also valid for two frame (or more) cross-correlation. Real time (continuous) auto-focus can be done every time a new guide frame is received even if the imaging camera shutter is opened, unlike the traditional auto-focus techniques used in today's astrophotography. Detailed explanation of this technology, known as SharpLock (SL), can be found in the utility U.S. Pat. No. 9,473,690B1 therefore we'll assume in this document that the reader has access to this material and knowledge. When using an on axis guider (ONAG, see utility U.S. Pat. No. 9,319,638B1) its dichroic beam splitter acts as aberration device creating an astigmatism for the guider (which sees the astronomical target through the dichroic mirror) which is fundamental for SL. The cross-correlation of a given guide frame, Corr_1_1, reflects the astigmatism on the guide image, which is a function of the focus. Therefore the real time auto-focus approach (SL technology) disclosed in the utility U.S. Pat. No. 9,473,690B1 can be reused when processing the Corr_1_1 (or Corr_1_2) image even though the guide frame may content a wild field sky image with many stars, if any, and/or other astronomical structures, such as galaxies, nebulae, . . . ).

Figure 11:
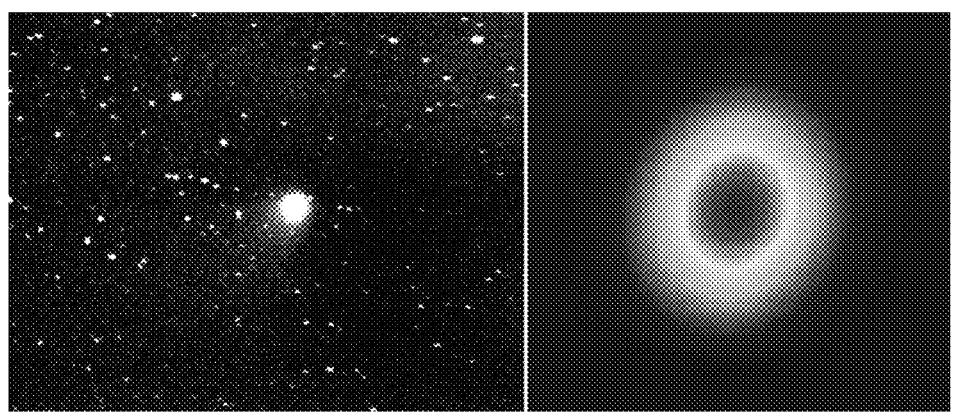
FIG. 11 is a picture showing a current guide frame and a cross-correlation image with itself, wherein the scope is in focus.

The FIG. 11 above shows the cross correlation of a guide frame (say the current, last one) with itself when the scope is at best focus. The guide frame is on the left, on the right the Corr_1_1 is shown with its amplitude color coded (as described above in this document).

The shape of the Corr_1_1 is used (as described in the utility U.S. Pat. No. 9,473,690B1) for retrieving focus information and focuser correction directionally (in or out, intra or extra focal). As disclosed and claimed in the utility U.S. Pat. No. 9,473,690B1 this can be done with various optical techniques to create aberrations which are focus dependent, here we have using the ONAH induced astigmatism for the guider as an example. It should be understood that this auto-focus (and auto-guiding) cross-correlation approach can be used with a guide image having only one star (a guide star) as well.

Figure 12:
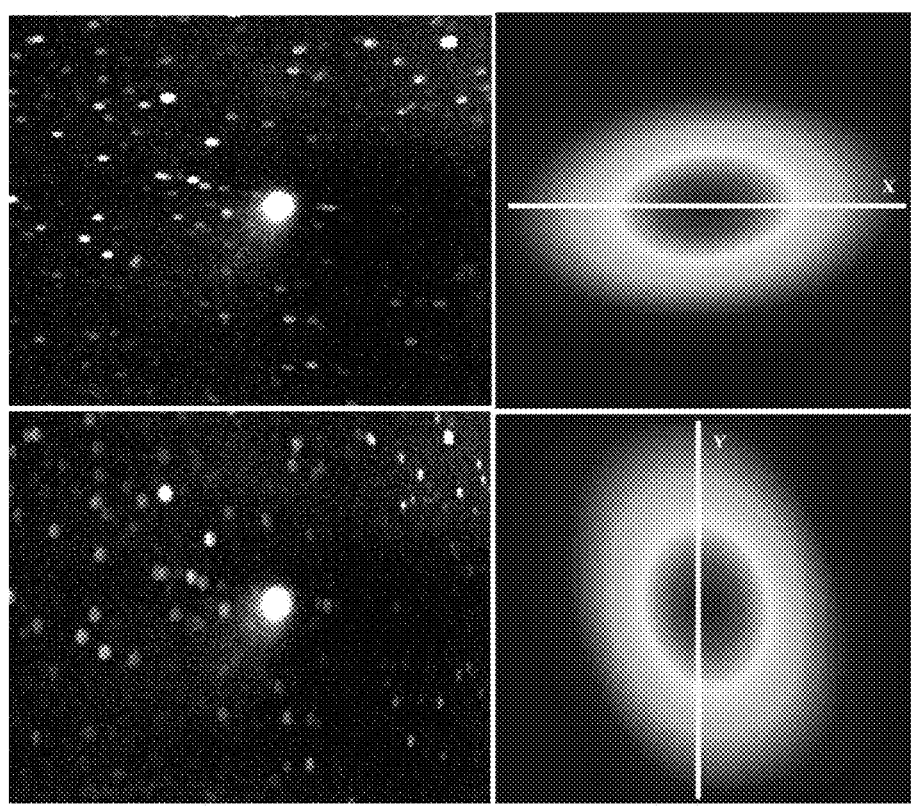
FIG. 12 is a picture showing a current guide frame and a cross-correlation image with itself, wherein the scope is out of focus.

Above the FIG. 12 shows the same sky field when the scope is out of focus. On the top the intra-focal situation (focuser in), on the bottom the extra focal (focuser out) situations. On the left out of focus guide frames, on the right the associated cross-correlation images of themselves (Corr_1_1). One can see the typical out of focus astigmatism induced by the ONAG on the guider. In the intra focus case the Corr_1_1 is elongated in the X direction, while the extra-focal case leads to a Y elongation. However, those elongation directions are dependent of the orientation (like rotation) of the guider versus the aberration device (ONAG in the case), any axis can be rotated by any angle, it would not matter for focusing after proper calibration (see utility U.S. Pat. No. 9,473,690B1 for further information).

Figure 13:
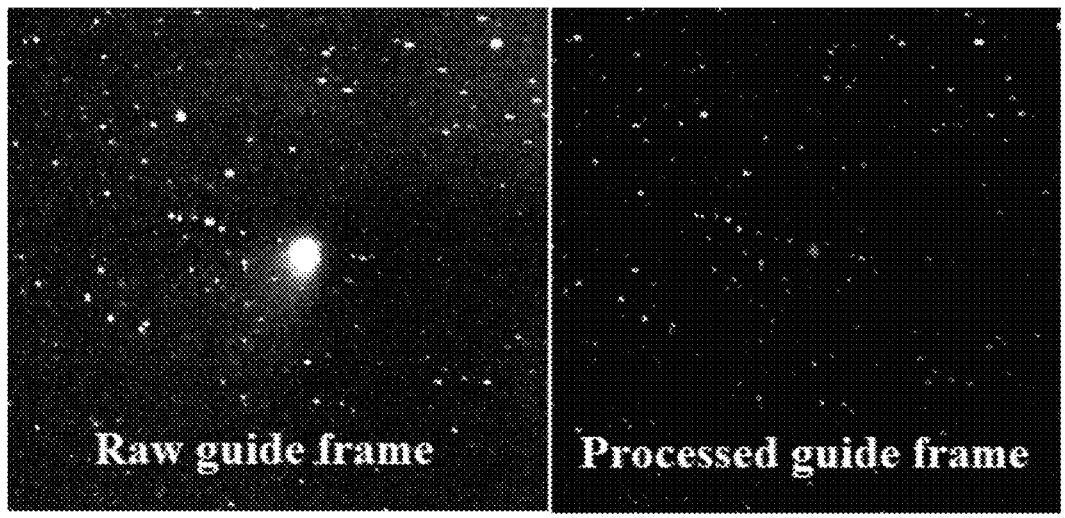
FIG. 13 is a picture showing a raw guide frame versus a pre-processed guide frame.

The next FIG. 13 shows an example of the frame pre-processing used to enhance the image SNR.

Using digital and statistical image processing (as explained above in this document) the noise has been considerably reduced (see the right, processed, image versus the left raw guide frame image). For instance, here a digital filter was used to reduce the impact of large uniform fuzzy structures, such as the comet halo, in the auto-focus calculation. It should be understood that is just one example of the possible pre-processing which can be applied to the frames before the auto-guiding and/or auto-focus calculation disclosed above. Those examples do not limit in away the scope of this invention. Also the present invention, using the full guide frame, can be used for auto-guiding or auto-focus alone, or for both together.

Although the invention has been explained in relation to its preferred embodiment, it is to be understood that many other possible modifications and variations can be made without departing from the spirit and scope of the invention as hereinafter claimed.

What is claimed is:

1. A method of correcting imaging errors for a telescope by referencing a field of view of the telescope, the method comprises the steps of:
    (A) providing an image collecting device, a science camera, a second camera, a computing device, and an orientation mechanism;
    (B) actuating the orientation mechanism to position a target within a field of view (FOV) of the image collecting device;
    (C) receiving exposure data through the image collecting device, wherein the exposure data includes visual information of the target and the FOV;
    (D) progressively recording the visual information of the target as a target image with the science camera;
    (E) sequentially recording the visual information of the FOV as a series of FOV images with the second camera during step (D);
    (F) comparing the series of FOV images amongst each other with the computing device in order to identify visual discrepancies between the series of FOV images;
    (G) generating a set of guiding corrections with the computing unit to compensate for the visual discrepancies between the series of FOV images; and
    (H) executing the set of guiding corrections with the orientation mechanism during step (D).

2. The method of correcting imaging errors for a telescope by referencing a field of view of the telescope, the method as claimed in claim 1 comprises the step of:
    accentuating a plurality of notable visual features within the series of FOV images by executing at least one noise reduction process on the series of FOV images with the computing unit before step (F).

3. The method of correcting imaging errors for a telescope by referencing a field of view of the telescope, the method as claimed in claim 2 comprises the steps of:
    designating a reference image and a plurality of subsequent images from the series of FOV images with the computing device; and
    recording the reference image over a longer exposure time than the plurality of subsequent images during step (E).

4. The method of correcting imaging errors for a telescope by referencing a field of view of the telescope, the method as claimed in claim 2 comprises the step of:
    applying a spatial median filter to each within the series of FOV images with the computing device.

5. The method of correcting imaging errors for a telescope by referencing a field of view of the telescope, the method as claimed in claim 2 comprises the steps of:
    mapping an intensity pattern for each within the series of FOV images with the computing device;
    statistically extracting a median intensity value from the intensity pattern with the computing device;
    comparing the median intensity value to the intensity pattern with the computing device in order to assess a noise pedestal for the intensity pattern;
    comparing the median intensity value to the noise pedestal across the intensity pattern with the computing device in order to estimate a noise-floor standard deviation; and
    removing the noise pedestal and a portion of the noise-floor standard deviation from the intensity pattern with the computing device.

6. The method of correcting imaging errors for a telescope by referencing a field of view of the telescope, the method as claimed in claim 1 comprises the steps of:
    designating a reference image and a plurality of subsequent images from the series of FOV images with the computing device;
    applying an image registration to the reference image and to each subsequent image with the computing device;
    executing an image correlation process between the reference image and each subsequent image with the computing device in order to identify at least one common visual feature between the reference image and each subsequent image;

recognizing a registration error between the reference image and at least one specific image from the plurality of subsequent images with the computing device, if the common visual feature within the reference image and the common visual feature within the specific image are offset from each other in accordance to the image registration; and designating the registration error as one of the visual discrepancies between the series of FOV images with the computing device.

7. The method of correcting imaging errors for a telescope by referencing a field of view of the telescope, the method as claimed in claim 6, wherein a translational offset between the common visual feature within the reference image and the common visual feature within the specific image in accordance to the image registration indicates a translation guiding correction by the orientation mechanism.

8. The method of correcting imaging errors for a telescope by referencing a field of view of the telescope, the method as claimed in claim 6, wherein a rotational offset between the common visual feature within the reference image and the common visual feature within the specific image in accordance to the image registration indicates a rotational guiding correction by the orientation mechanism.

9. The method of correcting imaging errors for a telescope by referencing a field of view of the telescope, the method as claimed in claim 6, wherein the image correlation process compares an intensity pattern of the reference image to an intensity pattern of each subsequent image via correlation metrics in order to identify the at least one common visual feature between the reference image and each subsequent image.

10. The method of correcting imaging errors for a telescope by referencing a field of view of the telescope, the method as claimed in claim 1 comprises the steps of:
providing a focuser;
generating a set of focusing corrections with the computing unit to compensate for the visual discrepancies between the series of FOV images after step (F); and
executing the set of focusing corrections with the focuser during step (D).

11. The method of correcting imaging errors for a telescope by referencing a field of view of the telescope, the method as claimed in claim 10 comprises the steps of:
designating a reference image and a plurality of subsequent images from the series of FOV images with the computing device;
applying an image registration to the reference image and to each subsequent image with the computing device;
executing an image correlation process between the reference image and each subsequent image with the computing device in order to identify at least one common visual feature between the reference image and each subsequent image;

recognizing a registration error between the reference image and at least one specific image from the plurality of subsequent images with the computing device, if a transformation of the common visual feature occurs from the reference image to the specific image in accordance to the image registration; and designating the registration error as one of the visual discrepancies between the series of FOV images with the computing device.

12. The method of correcting imaging errors for a telescope by referencing a field of view of the telescope, the method as claimed in claim 11, wherein the transformation of the common visual feature elongated in a first direction indicates an intra-focal correction by the focuser, and wherein the transformation of the common visual feature elongated in a second direction indicates an extra-focal correction by the focuser, and wherein the first direction and the second direction are perpendicular to each other.

13. The method of correcting imaging errors for a telescope by referencing a field of view of the telescope, the method as claimed in claim 11, wherein the image correlation process compares an intensity pattern of the reference image to an intensity pattern of each subsequent image via correlation metrics in order to identify the at least one common visual feature between the reference image and each subsequent image.

14. The method of correcting imaging errors for a telescope by referencing a field of view of the telescope, the method as claimed in claim 1 comprises the steps of:
prompting to select a desired section of the FOV with the computing device before step (F); and
comparing the desired section within the series of FOV images amongst each other with the computing device during step (F) in order to identify the visual discrepancies between the series of FOV images, if the desired section of the FOV is selected with the computing device.

15. The method of correcting imaging errors for a telescope by referencing a field of view of the telescope, the method as claimed in claim 1 comprises the steps of:
prompting to select an undesired section of the FOV with the computing device before step (F);
designating a remainder portion of the FOV with the computing device, if the undesired section of the FOV is selected with the computing device; and
comparing the remainder portion within the series of FOV images amongst each other with the computing device during step (F) in order to identify the visual discrepancies between the series of FOV images.

* * * * *